(12) United States Patent
Adams et al.

(10) Patent No.: US 9,814,348 B1
(45) Date of Patent: Nov. 14, 2017

(54) REUSABLE PORTABLE CAMPFIRE COVER

(71) Applicants: Todd Adams, Montrose, PA (US);
Grant E Adams, Meshoppen, PA (US)

(72) Inventors: Todd Adams, Montrose, PA (US);
Grant E Adams, Meshoppen, PA (US)

( * ) Notice: Subject to any disclaimer, the term of this patent is extended or adjusted under 35 U.S.C. 154(b) by 231 days.

(21) Appl. No.: 14/723,842

(22) Filed: May 28, 2015

(51) Int. Cl.
*A47J 33/00* (2006.01)

(52) U.S. Cl.
CPC ..................... *A47J 33/00* (2013.01)

(58) Field of Classification Search
CPC ....................................................... A47J 33/00
See application file for complete search history.

(56) References Cited

U.S. PATENT DOCUMENTS

| | | | | |
|---|---|---|---|---|
| 2,998,002 | A * | 8/1961 | Standig | A47J 37/0763 126/25 A |
| 3,067,737 | A | 12/1962 | Brown | |
| 3,119,386 | A * | 1/1964 | Farro | A47J 37/0786 126/25 C |
| 3,386,433 | A | 6/1968 | Copeland et al. | |
| 3,494,349 | A * | 2/1970 | Allen | A47J 37/0786 126/25 B |
| 3,537,388 | A | 11/1970 | Martin | |
| 4,074,680 | A | 2/1978 | Gooding | |
| 4,120,280 | A | 10/1978 | Iverson et al. | |
| 4,210,118 | A | 7/1980 | Davis et al. | |
| 4,732,138 | A | 3/1988 | Vos | |
| 5,222,475 | A | 6/1993 | Greener | |
| 6,298,843 | B1 * | 10/2001 | Olsen | A47J 37/0763 126/25 A |
| 6,516,792 | B1 * | 2/2003 | McDonald | F24C 1/16 126/25 A |
| 6,711,993 | B2 | 1/2004 | Robertson | |
| 6,868,384 | B2 | 3/2005 | Endres | |
| 2004/0200359 | A1 | 10/2004 | Snider | |
| 2006/0102169 | A1 * | 5/2006 | Smolinsky | A47J 33/00 126/500 |
| 2009/0205626 | A1 | 8/2009 | Ferreiro et al. | |
| 2012/0060699 | A1 | 3/2012 | Shidler et al. | |

OTHER PUBLICATIONS

"Outdoor Pizza Oven Campfire" http://www.pinterest.com/pin/192880796511775250/.
"Last Campfire Pizza" http://pragmaticpizza.blogspot.com/2011/08/last-campfire-pizza-of-2011.html.
"Magic Hanging Grill" http://www.dvice/com/archives/2008/03/notcot_designer.php.
"Volcano Grill Lid" http://www.overstock.com/Sports-Toys/Volcano-Grill-Lid/9570309/product.html?refccid+KKG25576VVJZUHKHVPWRG521&searchidx=16.

* cited by examiner

*Primary Examiner* — Sarah McPartlin
(74) *Attorney, Agent, or Firm* — Kollas and Kennedy; James W. Kollas, Esq.

(57) ABSTRACT

A reusable, portable campfire cover is disclosed herein. In its most basic configuration, the cover device (10) comprises three partial-conical panels, which are identified as a door panel (22), a first side panel (24), and a second side panel (26). Door panel (22) includes a handle (28). Each panel has a slot (30) and finger (32) feature in its base. Each panel has an aperture (34) or hole (36) near its top. The aperture (34) or hole (36) features are able to accept connectors, preferably an "S" hook connector (44). Cover device (10) is meant to be used in conjunction with a typical, independent tripod campfire device (20), which can be found in the prior art and in the consumer marketplace.

3 Claims, 6 Drawing Sheets

REUSABLE PORTABLE CAMPFIRE COVER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Discussion of Prior Art

Many people enjoy the outdoors. As part of that enjoyment, some people choose to build a campfire and prepare food over it. Food preparation over a campfire can comprise smoking, cooking, or baking.

After a campfire has been started, those using the campfire must be careful to protect the campfire from the elements to keep it lit. Additionally, a lit campfire should be carefully monitored and contained as circumstances dictate.

Some people use a tripod equipped with a chain assembly to support a grill above a fire. Devices of this sort are common in the prior art. Typically, these tripod campfire devices are used above a circular fire container or fire-pit, which can be constructed in numerous ways, but is often a former automobile rim. Numerous examples of such tripod campfire devices follow.

First, in U.S. Pat. No. 4,120,280 to Iverson, an adjustable grill device is shown. This device implements a tripod configuration for at least three legs which join at the top in a head assembly. A chain, which can be hooked to one of the legs, runs from the leg to a pulley, continues vertically downward from the pulley, and then splits into three separate chain sections which attach to a circular grill rack. This device does not mention a cover for placement over the grill rack and among the three separate chain sections.

Second, in U.S. Pat. No. 4,732,138 to Vos, a campfire cooker is illustrated. FIG. 2 therein displays the tripod configuration with two circular grill racks, the chain assembly found in Iverson, and an additional chain assembly for the lower of the two circular grill racks. This device also incorporates a fire bowl, a wind screen, and bell-shaped smoker attachment. This device is overly complex, and it does not provide for a cover fitting among the chained sections.

Third, U.S. Pat. No. 6,868,849 to Endres presents an adjustable campfire tripod. Similarly to Iverson, three legs of a stand form a tripod device, which is equipped with a chain assembly. The chain therein is slidingly affixed to one leg of the tripod, runs to the top of the tripod, continues down, and then breaks into three chain sections. Again, no cover is disclosed for use among the chain sections.

Other devices found in the prior art find application in campfire or outdoor cooking settings. While these devices use a cover, the cover used would not fit or otherwise suffice in tripod campfire devices implementing a chain assembly. Nor do these covers allow enough variety in usage. Several examples of this portion of the prior art follow.

First, in U.S. Pat. No. 3,386,433 to Copeland, a device for cooking food is shown. This device discloses a lid with a large hinged door for use above an upper grating and lower grating. This lid makes no provision for use in a tripod campfire configuration. Other than providing access to the interior of the device, no discussion is given regarding the advantages of the hinged door or the lid.

Second, in U.S. Pat. No. 5,222,475 to Greener, a barbeque grill apparatus is illustrated. This device implements a large and cumbersome cover hood equipped with numerous features as displayed in FIGS. 1 and 4 therein. A large door plate is mounted to said cover hood on hinges. The size of the cover hood reduces its portability. Furthermore, the cover hood makes no provision for use in a tripod campfire configuration.

Third, U.S. Patent Application 200410200359A1 by Snider shows an outdoor cooker oven. This device displays a truncated conical cooking housing means designed to accept a top cook pan. Such a configuration could not be reasonably implemented in a three chain assembly found on a tripod campfire stand. Cooking food, without more, is the listed purpose of the device.

Despite all these prior art references, no device can be found which is reusable and readily portable, with the ability to be implemented over a tripod campfire device as a smoker, cooker, baker, fire-saver, or fire-preventer. The present invention fulfills this role.

BRIEF SUMMARY OF THE INVENTION

In accordance with the present invention, a reusable, portable campfire cover is disclosed herein. In its most basic configuration, the cover device comprises three partial-conical panels, which are identified as a door panel, a first side panel, and a second side panel. The door panel includes a handle feature. Each panel has a slot and finger feature in its base. Each panel has an aperture or hole feature near its top. The aperture or hole features are able to accept connectors. The cover device is meant to be used in conjunction with a typical, independent tripod campfire stand, as can be found in the prior art and in the consumer marketplace.

OBJECTS AND ADVANTAGES

Accordingly, the objects and advantages of the invention are:

A) to provide a reusable, portable campfire cover device which can be used to smoke food;

B) to provide a reusable, portable campfire cover device which can be used to cook food;

C) to provide a reusable, portable campfire cover device which can be used to bake food or fulfill oven purposes;

D) to provide a reusable, portable campfire cover device which can be used as a fire-saver;

E) to provide a reusable, portable campfire cover device which can be used as a fire-preventer;

Further objects and advantages are to provide a campfire cover device which is reusable and portable. Still further objects and advantages will become apparent from consideration of the ensuing description and drawings.

REFERENCE NUMERALS IN DRAWINGS

Figure 1:
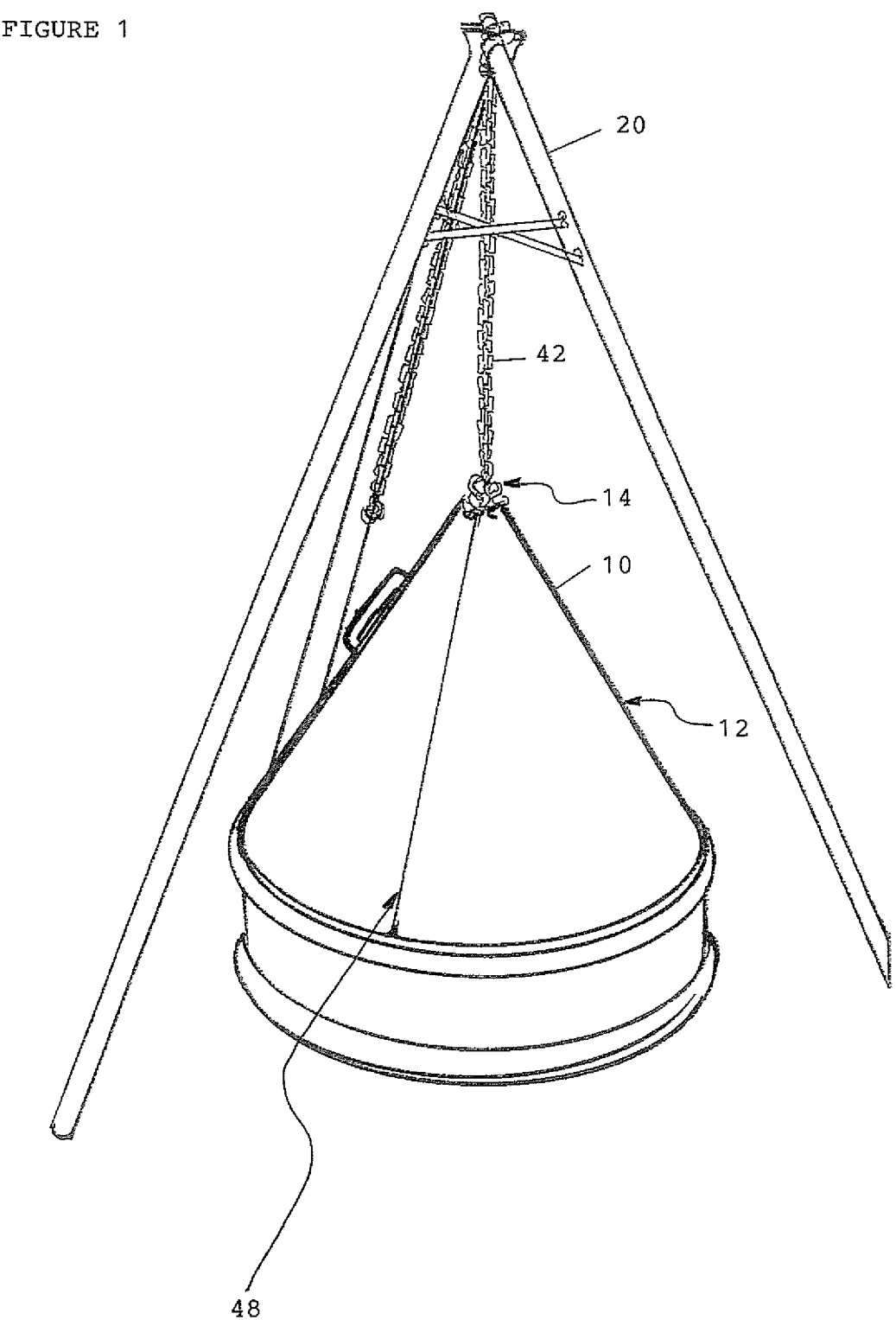
FIG. 1 is an Isometric View of the Preferred Embodiment of the Reusable Portable Campfire Cover in the Second Configuration.

10 Cover device
12 Covering means
14 Connecting means
16 Insert means
18 Grill rack
20 Tripod campfire device
22 Door panel
24 First side panel
26 Second side panel
28 Handle
30 Slot
32 Finger
34 Aperture
36 Hole
38 Chain assembly
40 Bars
42 Vertical chain
44 "S" hook connector
46 First configuration
48 Second configuration

DETAILED DESCRIPTION OF INVENTION

Figure 2:
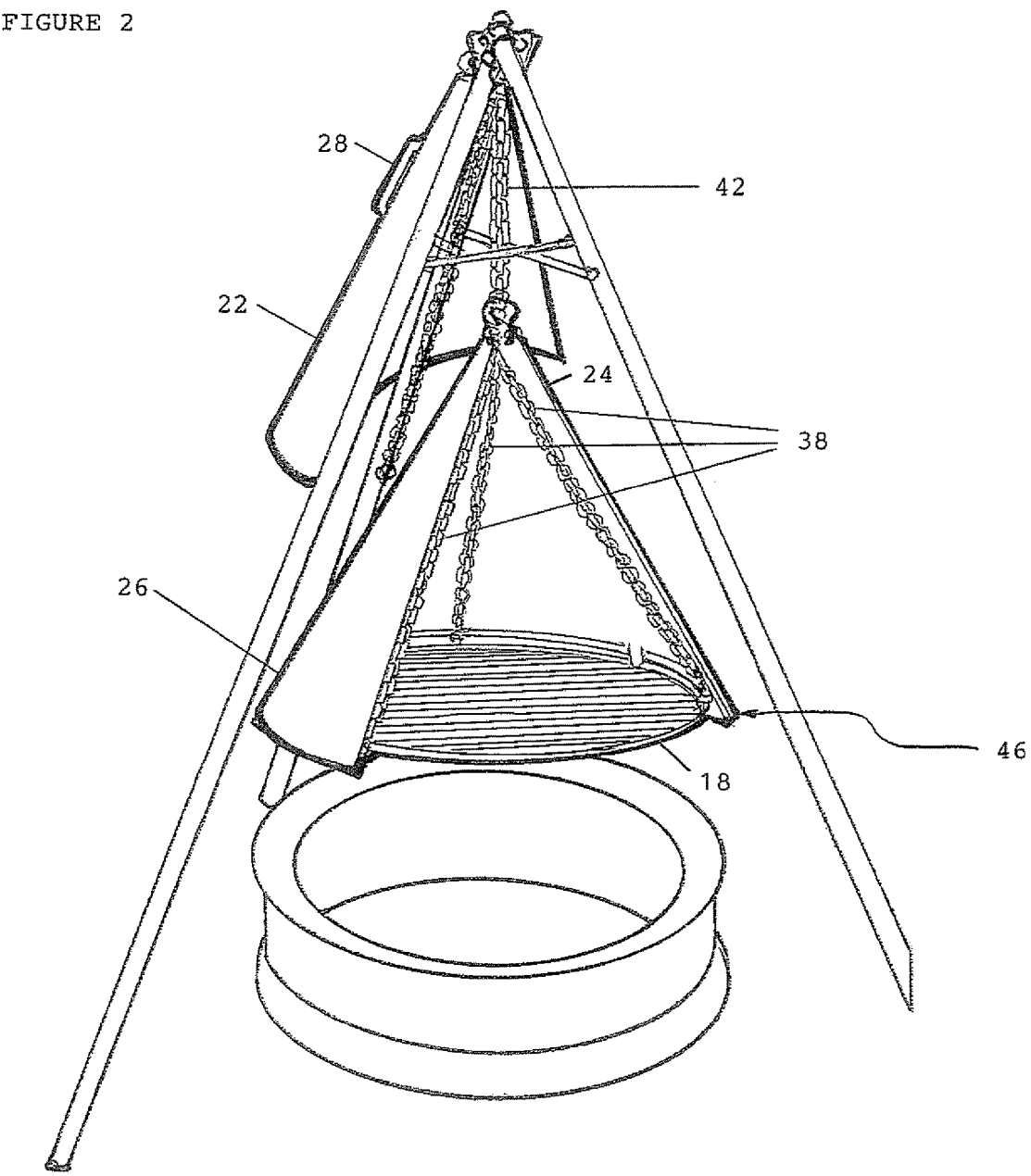
FIG. 2 is an Isometric View of the Preferred Embodiment of the Reusable Portable Campfire Cover in the First Configuration also Displaying the Door Panel Stored on a Tripod Campfire Device.

In accordance with the present invention, a reusable, portable campfire cover is disclosed herein. In its most basic configuration, the cover device 10 comprises a covering means 12 for covering a common grill rack 18, a connecting means 14 for attaching the covering means to the chains of a tripod campfire device 20, and an insert means 16 for securing the covering means to the grill rack 18. See FIGS. 1 and 2.

In the preferred embodiment, covering means 12 comprises three partial-conical shaped sectional panels, which are identified as a door panel 22, a first side panel 24, and a second side panel 26. See FIG. 2. Preferably, each panel is made of a flexible, but sturdy material that is heat resistant.

Figure 3:
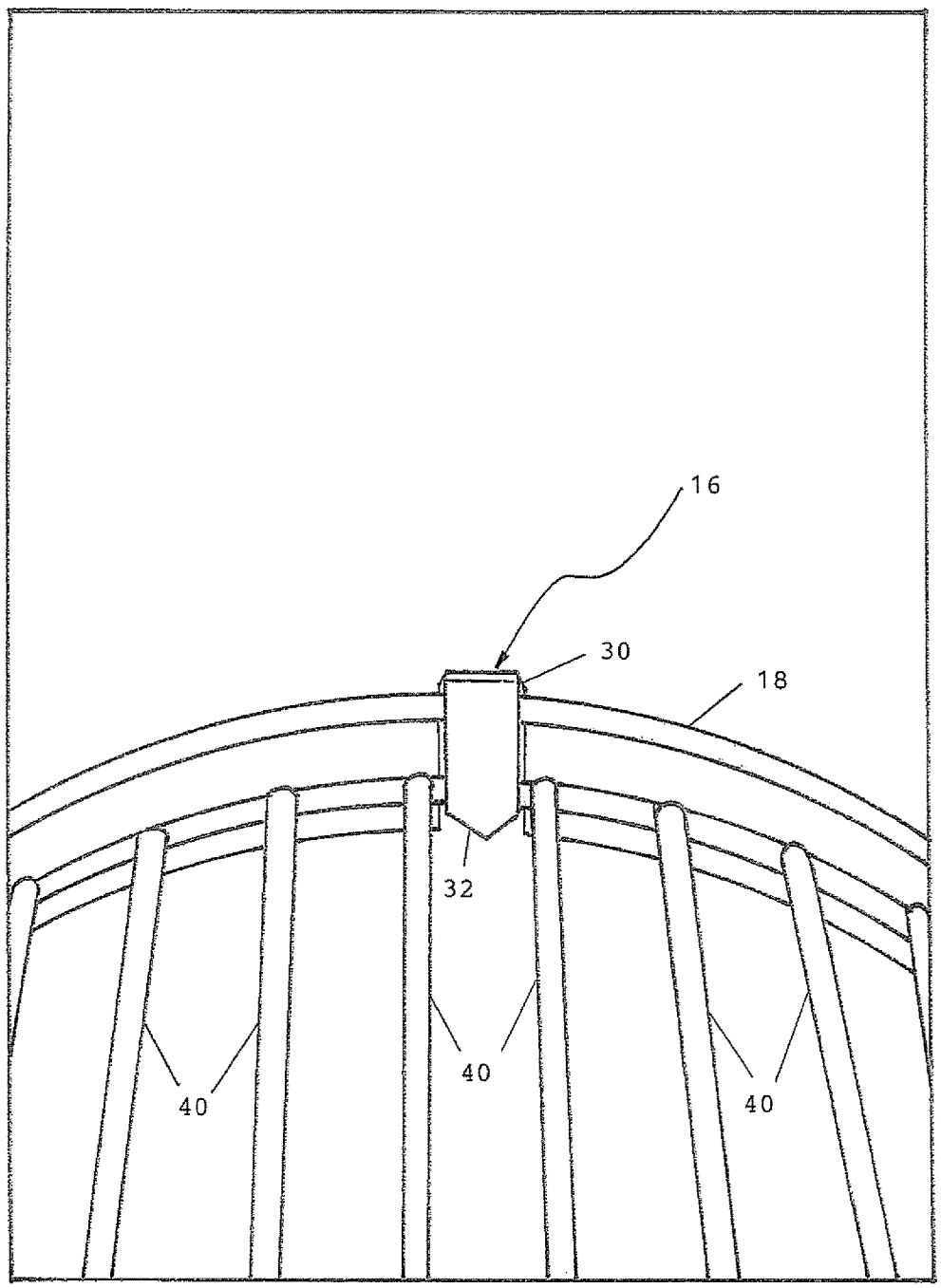
FIG. 3 is a Zoomed Front View of the Preferred Embodiment of the Reusable Portable Campfire Cover in the Second Configuration Prominently Displaying the Insert Means.
Figure 4:
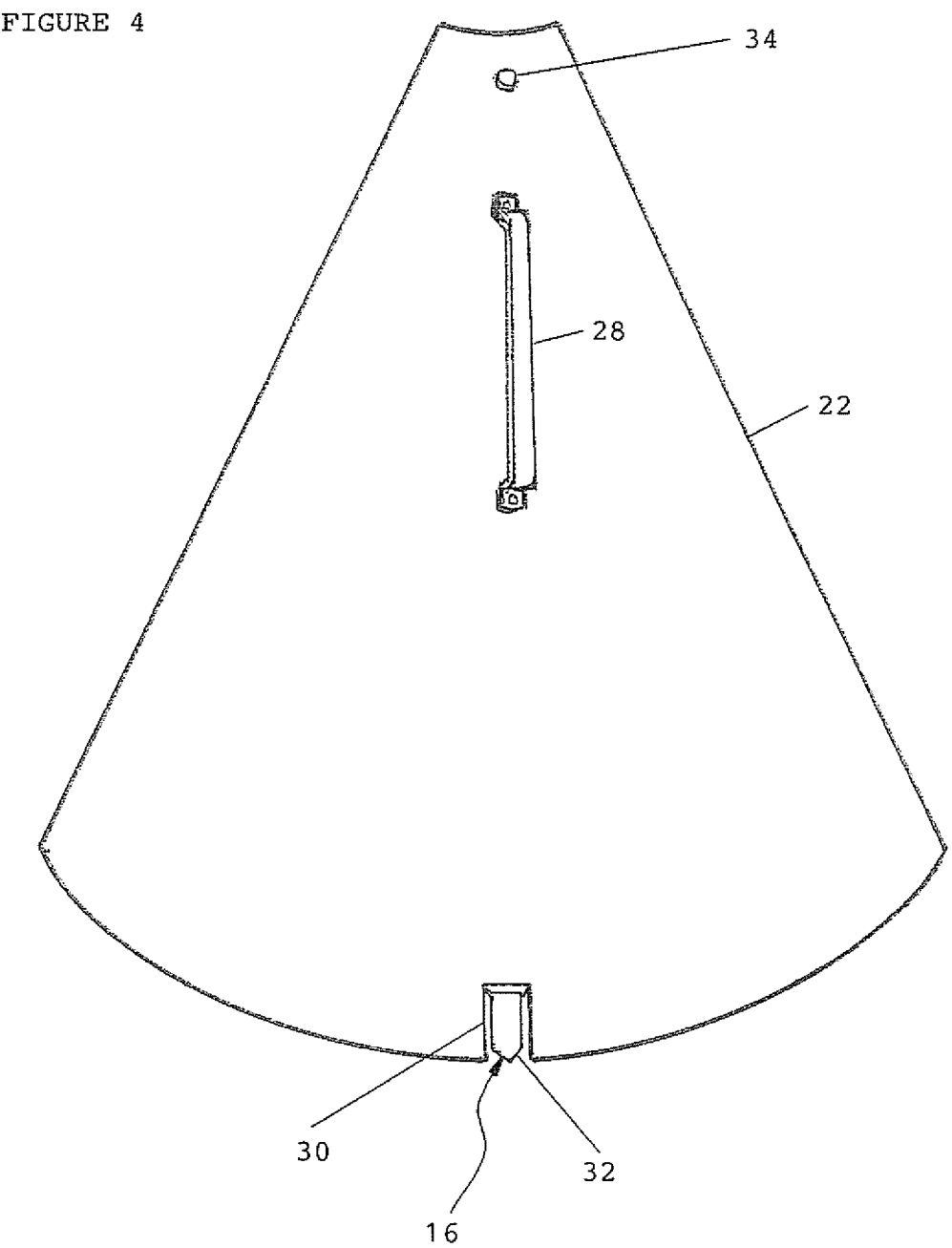
FIG. 4 is a Front View of the Exterior Side of the Door Panel.
Figure 5:
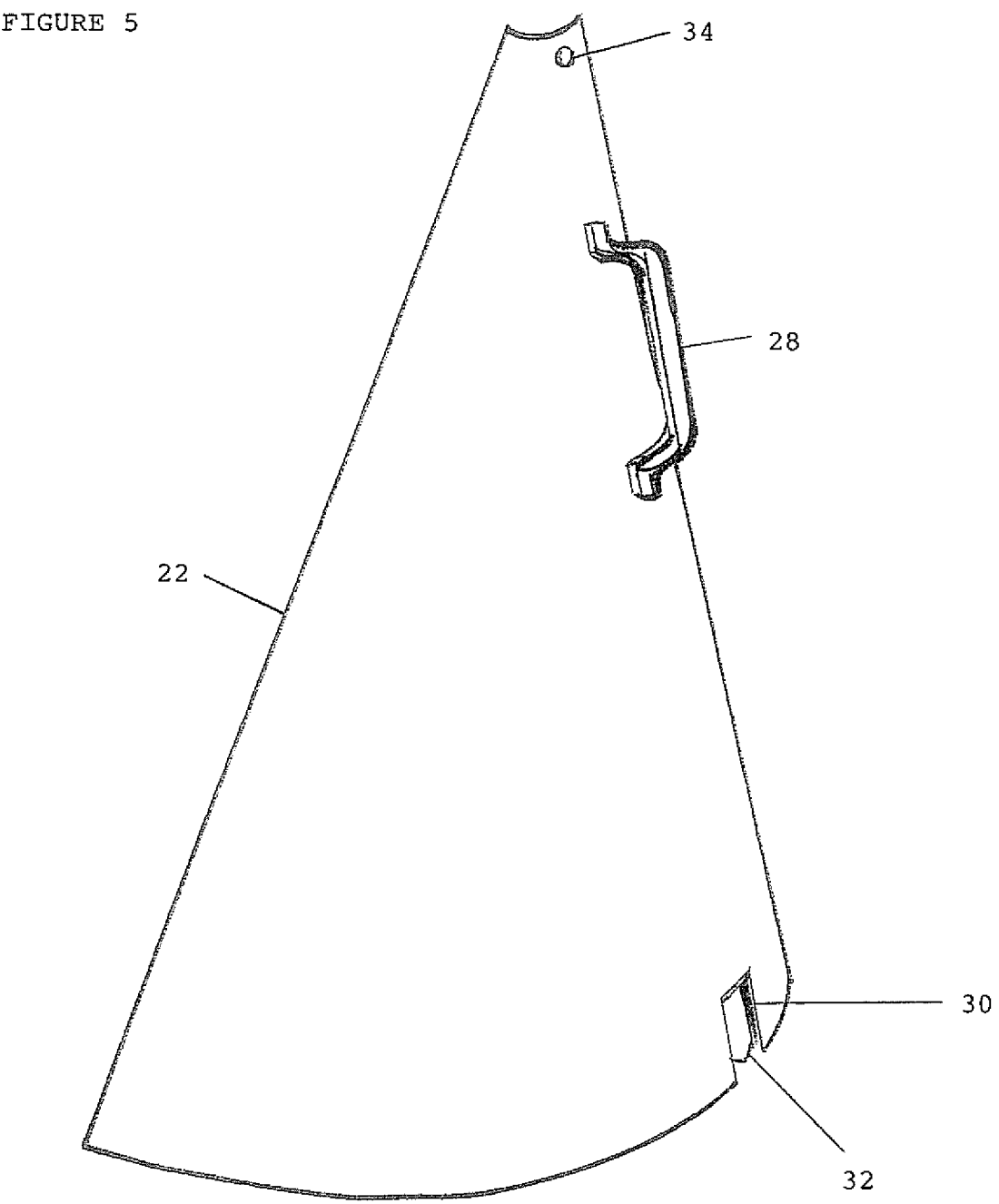
FIG. 5 is an Isometric View of the Exterior Side of the Door Panel.
Figure 6:
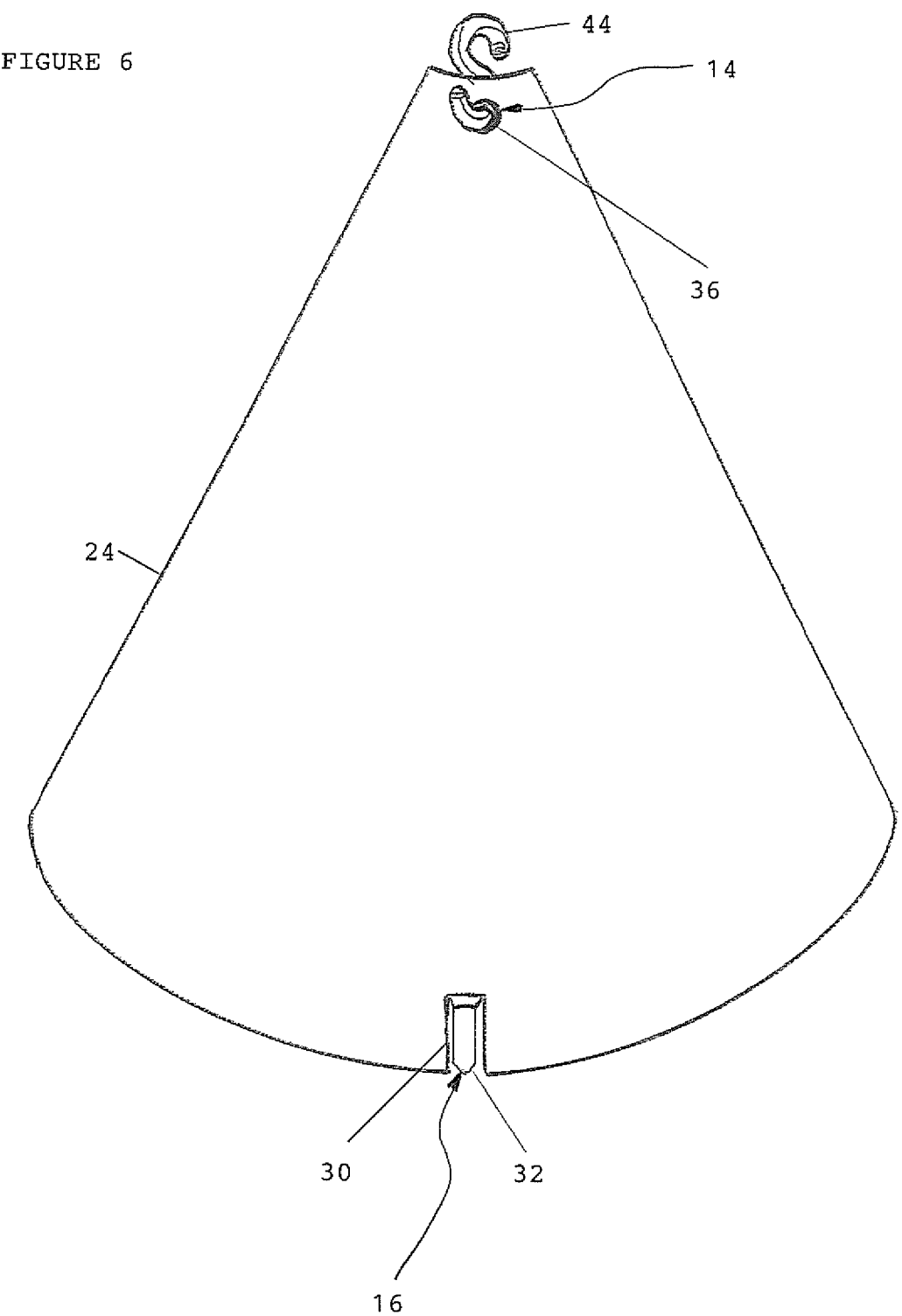
FIG. 6 is a Front View of the Exterior Side of a Side Panel with an "S" Hook Connector in Place.

Door panel 22 includes a handle 28, See FIGS. 4 and 5. As part of the insert means 16, each panel has a slot 30 and finger 32 on its base, preferably near the center. For each panel, finger 32 is integral with the panel and inwardly protrudes from the base of the inner surface of the panel. See FIGS. 3, 5, and 6. As part of connecting means 14, each panel has an aperture 34 or hole 36 near its top. As explained below, cover device 10 is meant to be used in conjunction with a typical, independent tripod campfire device 20 which can be found in the prior art and in the consumer marketplace.

After independent tripod campfire device 20 has been setup by the user of cover device 10, and the typical chain assembly 38 associated with tripod campfire device 20 completed, first side panel 24 is attached to grill rack 18 between two of the three chains holding grill rack 18 as implemented by tripod campfire device 20. Said attachment is accomplished via insert means 16. See FIG. 3.

In the preferred embodiment, insert means 16 comprises a finger 32 and slot 30. In operation, finger 32 fits between the bars 40 of grill rack 18, while the base of first side panel 24 slides into position around the perimeter of grill rack 18 via slot 30.

Then, the top of first side panel 24 is attached to the vertical chain 42 of the tripod campfire device 20. This is accomplished by using connecting means 14, which is preferably an "S" hook connector 44 in combination with aperture 34 or hole 36. See FIG. 6.

To accomplish the connection, one end of "S" hook connector 44 is placed through aperture 34 or hole 36 found near the top of first side panel 24, while the other end is threaded through the links of vertical chain 42 of tripod campfire device 20. See FIGS. 1 and 2.

Next, second side panel 26 is attached to grill rack 18 in a similar manner beside, and slightly over-lapping, first side panel 24. If so desired by the user, this first configuration 46 can be implemented by the user for the cooking role of the cover device 10. See FIG. 2.

The second configuration 48 of cover device 10 employs door panel 22 as well as first side panel 24 and second side panel 26. With first side panel 24 and second side panel 26 in place, door panel 22 is positioned between and slightly overlapping first side panel 24 and second side panel 26. Door panel 22 is then slid into position on grill rack 18 utilizing the same methodology as described above, resulting in the three panels forming a near conical section cover over grill rack 18, See FIG. 1. As such, when in second configuration 48, door panel 22, first side panel 24, and second side panel 26 do not fully converge at their respective tops to form an enclosed apex or vertex. Instead, an opening remains to allow vertical chain 42 to pass through the opening and reach chain assembly 38. See FIGS. 1, 2, 4, and 6. Second configuration 48 can be implemented by the user for the smoking, baking, fire-saver, or fire-preventer roles of cover device 10.

The role served by cover device 10 as implemented by a user thereof also depends upon the intensity of the campfire flames, the height of the grill relative to the campfire flames, and the status of the weather around the campfire. As such, the cover device serves numerous roles encompassing many weather and campfire conditions.

When not in use, any of the three panels may be stored by hooking them on tripod campfire device 20. See FIG. 2, for example, displaying door panel 22 hooked on tripod campfire device 20.

Alternative Embodiments

While the above description contains many specificities, these should not be construed as limitations on the scope of the invention, but rather as an exemplification of one preferred embodiment thereof. Many variations are possible and some are as follows.

First, the materials used in the cover device can be metal, plastic, composite, or other materials commonly used as oven hoods. Different materials allow differing strengths and weaknesses which would be used to match consumer preferences, needs, and budget restraints. Any material chosen should be fireproof or fire-resistant.

Second, while three panels are used in the preferred embodiment, it is possible to use two larger panels to serve as the second configuration. On the other hand, several panels could be implemented instead of the preferred three.

Third, while an "S" hook is the preferred connector, many other connectors or connecting methods could be used to secure the panels to the vertical chain of a tripod campfire stand. Such connecting methods include, but are limited to, straps, clamps, latches, integrated hooks, hook and loop fasteners, or the like.

Fourth, the "S" hook connector could be permanently attached to the top of each sectional panel. This could be accomplished by welding, soldering, or by other common fastening means available in the prior art.

Fifth, the handle affixed to the door panel is preferably attached by welding. However, the handle could be so affixed by bolts and nuts, screws, rivets, solder, or by other common fastening means available in the prior art.

Sixth, while the cover device is preferably used over a grill rack which is circular in shape, the cover device can be used over grill racks of many shapes. Some common shapes of grill racks for which the cover device may be used include, but are not necessarily limited to, triangular, polygonal (for example, square or rectangular), or elliptical (for example, oval).

The embodiments above-discussed are to be considered illustrative and not restrictive. Many more embodiments may be configured using combinations of the embodiments above-discussed. Thus, the scope of the invention should be determined by the appended claims and their legal equivalents.

CONCLUSIONS, RAMIFICATIONS, AND SCOPE

The utility of the reusable, portable campfire cover device is apparent. In the preferred embodiment, the device provides use as a smoker, cooker, baking oven, fire-saver, or fire-preventer. The three panels of the device are relatively simple in design, easy to transport, and can be reused over multiple occasions in many seasons.

Clearly, implementing the campfire cover device with an existing tripod campfire stand fills a void in the prior art. No other cover could be found to fit this role.

The above-discussion is to be considered illustrative and not restrictive. Thus, the scope of the invention should be determined by the appended claims and their legal equivalents.

We claim:

1. A reusable portable campfire cover device comprising, in combination:
   A. a door panel, with a hole or aperture near a top, and a slot and a finger inwardly protruding from a base,
   B. a first side panel, with a hole or aperture near a top, and a slot and a finger inwardly protruding from a base,
   C. a second side panel, with a hole or aperture near a top, and a slot and a finger inwardly protruding from a base, and
   D. three "S" hook connectors,
   whereby an opening remains among the tops of said door panel, said first side panel, and said second side panel, allowing a vertical chain to pass through the opening and reach a chain assembly.

2. A method for covering a grill rack implemented in an independent tripod campfire device, comprising the steps of:
   A. providing a side panel, with a hole or aperture near a top, and a slot and a finger inwardly protruding from a base,
   B. providing a second side panel, with a hole or aperture near a top, and a slot and a finger inwardly protruding from a base,
   C. providing said independent tripod campfire device, with a vertical chain, a chain assembly, and said grill rack,
   D. assembling said independent tripod campfire device with said vertical chain, said chain assembly, and said grill rack,
   E. placing said side panel over said chain assembly and onto said grill rack by positioning the finger on said side panel between two bars of said grill rack near a perimeter of said grill rack, and allowing the base on said side panel to fit around the perimeter of said grill rack via the slot of said side panel,
   F. connecting said side panel to said vertical chain by an "S" hook connector via the hole near the top of said side panel and through a link of the vertical chain,
   G. placing said second side panel over said chain assembly, beside said side panel, and onto said grill rack by positioning the finger on said second side panel between two bars of said grill rack near the perimeter of said grill rack, and allowing the base on said second side panel to fit around the perimeter of said grill rack via the slot of said second side panel,
   H. connecting said second side panel to said vertical chain by an "S" hook connector via the hole near the top of said second side panel and through a link of the vertical chain,
   whereby an opening remains among the tops of said first side panel and said second side panel, allowing said vertical chain to pass through the opening and reach said chain assembly.

3. The method of claim 2 further comprising the steps of:
   A. providing a door panel, with a hole or aperture near a top, and a slot and finger inwardly protruding from a base,
   B. placing said door panel over said chain assembly, between the side panel and the second side panel, and onto said grill rack by positioning the finger on said door panel between two bars of said grill rack near the perimeter of said grill rack, and allowing the base on said door panel to fit around the perimeter of said grill rack via the slot of said door panel,
   C. connecting said door panel to the vertical chain by an "S" hook connector via the hole near the top of said door panel and through a link of the vertical chain,
   whereby an opening remains among the tops of said door panel, said first side panel, and said second side panel, allowing said vertical chain to pass through the opening and reach said chain assembly.

* * * * *